United States Patent
Suzuki et al.

(10) Patent No.: US 10,450,914 B2
(45) Date of Patent: Oct. 22, 2019

(54) MANUFACTURING METHOD OF PLUGGED HONEYCOMB STRUCTURE

(71) Applicant: NGK INSULATORS, LTD., Nagoya (JP)

(72) Inventors: Michio Suzuki, Nagoya (JP); Kojiro Hayashi, Nagoya (JP); Yuji Watanabe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 226 days.

(21) Appl. No.: 15/460,424

(22) Filed: Mar. 16, 2017

(65) Prior Publication Data
US 2017/0284245 A1   Oct. 5, 2017

(30) Foreign Application Priority Data

Mar. 31, 2016   (JP) .................. 2016-071442

(51) Int. Cl.
| | | |
|---|---|---|
| *C04B 38/00* | (2006.01) | |
| *F01N 3/022* | (2006.01) | |
| *B28B 11/00* | (2006.01) | |
| *B01D 46/24* | (2006.01) | |

(52) U.S. Cl.
CPC ....... *F01N 3/0222* (2013.01); *B01D 46/2418* (2013.01); *B28B 11/006* (2013.01); *C04B 38/0012* (2013.01)

(58) Field of Classification Search
CPC ................................................ C04B 38/0012
See application file for complete search history.

(56) References Cited

U.S. PATENT DOCUMENTS

| | | |
|---|---|---|
| 8,003,035 B2 | 8/2011 | Ito et al. |
| 8,261,449 B2 | 9/2012 | Ichikawa |
| 2003/0160366 A1* | 8/2003 | Fukuta ................. B28B 11/006 264/630 |

(Continued)

FOREIGN PATENT DOCUMENTS

| | | |
|---|---|---|
| JP | 01-297114 A1 | 11/1989 |
| JP | 2001-300922 A1 | 10/2001 |

(Continued)

OTHER PUBLICATIONS

Dow Chemical Company, METHOCEL Cellulose Ethers Technical Handbook, Published Sep. 2002, USA, 32pgs (Year: 2002).*

(Continued)

*Primary Examiner* — Nathan H Empie
(74) *Attorney, Agent, or Firm* — Burr & Brown, PLLC

(57) ABSTRACT

The manufacturing method of the plugged honeycomb structure includes a honeycomb structure forming step of forming a pillar-shaped honeycomb structure, and a plugging step of forming plugging portions in end portions of the cells of the honeycomb structure formed in the honeycomb structure forming step, and in the plugging step, there is performed a press pouring operation of pressing one end face of the honeycomb structure into a plugging slurry stored in a bottomed tubular container to pour, under pressure, the plugging slurry into the cells of the honeycomb structure, and as the plugging slurry of the plugging step, there is used a slurry in which a yield point viscosity of a viscous fluidity is 600 Pa·s or more, a recovery viscosity is 300 Pa·s or more, and a high shearing viscosity is 200 Pa·s or less.

5 Claims, 2 Drawing Sheets

(56) References Cited

U.S. PATENT DOCUMENTS

| | | | |
|---|---|---|---|
| 2008/0006972 A1 | 1/2008 | Ichikawa | |
| 2009/0142499 A1* | 6/2009 | Cecce | C04B 26/285 |
| | | | 427/372.2 |
| 2009/0283928 A1 | 11/2009 | Ito et al. | |
| 2015/0121827 A1* | 5/2015 | Cai | C04B 38/0012 |
| | | | 55/523 |

FOREIGN PATENT DOCUMENTS

| | | |
|---|---|---|
| JP | 2005-014240 A1 | 1/2005 |
| JP | 2008-030469 A1 | 2/2008 |
| JP | 2011-225433 A1 | 11/2011 |
| JP | 2015-524377 A1 | 8/2015 |
| WO | 2008/114637 A1 | 9/2008 |
| WO | 2009/088078 A1 | 7/2009 |

OTHER PUBLICATIONS

Japanese Office Action (Application No. 2016-071442) dated Jul. 9, 2019 (with English translation).

* cited by examiner

MANUFACTURING METHOD OF PLUGGED HONEYCOMB STRUCTURE

"The present application is an application based on JP-2016-071442 filed on Mar. 31, 2016 with Japan Patent Office, the entire contents of which are incorporated herein by reference."

BACKGROUND OF THE INVENTION

Field of the Invention

The present invention relates to a manufacturing method of a plugged honeycomb structure, and more particularly, it relates to a manufacturing method of the plugged honeycomb structure in which it is possible to decrease a plugging slurry to be discarded in charging the plugging slurry into cells.

Description of the Related Art

Heretofore, in cars and the like, filters (diesel particulate filters (DPF)) to trap particulate matter (PM) to be emitted from a diesel engine and the like have been used. As this filter, there is known a filter (a plugged honeycomb structure) including a honeycomb structure having porous partition walls defining a plurality of cells which become through channels for fluid, and plugging portions disposed in end portions of the cells of this honeycomb structure.

In this plugged honeycomb structure, when introducing an exhaust gas into the cells from an inlet-side end face, the exhaust gas permeates the porous partition walls to flow into adjacent cells, and a purified exhaust gas is emitted from an outlet-side end face. In this way, when the exhaust gas permeates the partition walls, dust and particulates contained in the exhaust gas are trapped in the partition walls.

Furthermore, this plugged honeycomb structure can be prepared by obtaining, by extrusion, a pillar-shaped honeycomb structure having the porous partition walls defining the plurality of cells which become through channels for the fluid, and then subjecting the honeycomb structure to a plugging step.

As an operation to be performed in the plugging step, various operations are known (e.g., see Patent Documents 1 to 3). Specifically, there is a method as follows. First, an adhesive film is attached to one end face of a honeycomb formed body, and by laser processing in which image processing is utilized, holes are made only in portions of the adhesive film which correspond to the cells to be plugged. In this way, there is performed an operation of attaching a mask to the one end face of the honeycomb formed body. Then, the one end face of the honeycomb formed body to which the mask is attached is immersed into a slurried plugging material (a plugging slurry) containing a ceramic material and stored in a container, to charge the plugging material into the cells in which the plugging portions are to be formed. Next, as to the other end face of the honeycomb formed body, the plugging material is also similarly charged into the cells in which the plugging portions are to be formed. It is to be noted that various plugging materials are also reported (e.g., see Patent Document 4).

[Patent Document 1] JP-A-2008-30469
[Patent Document 2] WO 2008-114637
[Patent Document 3] JP-A-2001-300922
[Patent Document 4] JP-A-H01-297114

SUMMARY OF THE INVENTION

However, in methods described in Patent Documents 1 to 3, there is further room for improvement in a viewpoint of decreasing a wasted plugging slurry. Furthermore, also in a case where a plugging material described in Patent Document 4 is used, there is the problem that the wasted plugging slurry cannot be decreased.

Specifically, in the method described in Patent Document 1, a depth of each plugging portion in a circumferential portion of a honeycomb structure can be uniformized, and the method can simply be performed at low cost. That is, in the method described in Patent Document 1, for the purpose of solving the problem that even when a liquid surface is leveled, a slurry escapes in the circumferential portion of the honeycomb structure, a plugging material formed into a predetermined shape includes a plastic material possessing a viscous fluidity. Furthermore, this plugging material includes at least one selected from the group consisting of gelatin, agar, starch, silica gel and the like, and further includes a foamable resin which expands due to heating or a water absorbable resin which expands due to added water. On the other hand, in the method described in Patent Document 1, the plugging material is formed by using a stationary die, and hence there is the problem that the plugging material might not be supplied to predetermined cells due to position shift from the honeycomb structure.

The method described in Patent Document 2 is directed to a method of adjusting an inside of each cell into a negative pressure and performing immersion while vibrating a plugging material. Specifically, in the method described in Patent Document 2, to solve the problem that a sufficient depth of each plugging portion cannot be obtained only by the vibration, suction is performed to obtain the negative pressure, thereby preventing mixture of air as much as possible. Here, in the method described in Patent Document 2, equipment becomes complicated, and furthermore, each side is separately plugged, thereby worsening an efficiency. That is, it is considered that in a method which is simplest and most desirable, the equipment is not complicated, but the plugging material can be inserted into a predetermined depth only by performing the immersion.

In the method described in Patent Document 3, to solve the problem of a stationary mask, there is employed a disposable mask obtained by attaching a sheet to an end face of a honeycomb formed body and then making holes. In this method, a slurry might escape in a circumferential portion of the honeycomb formed body. Consequently, there is the fear that plugging portions having a uniform depth are not obtainable in this method. Furthermore, a plugging material has a fluidity, and hence in the method described in Patent Document 3, the plugging material might flow backwards due to an inner pressure after the end face is immersed into the plugging material. Consequently, in the method described in Patent Document 3, the plugging portions having the uniform depth cannot be formed and defects tend to be easily generated.

Patent Document 4 discloses a plugging material which is made of a mixture of ceramic powder constituting a substrate, a volatile solvent and an organic bonding material, for the purpose of bringing the substrate into contact closely with the plugging material in a nearly complete state. Specifically, it is described in Patent Document 4 that as the volatile solvent, butylcarbitol, terpineol, hexanol or the like having a molecular weight of 50 to 300 is used. It is also described in Patent Document 4 that as the organic bonding material, starch, dextrin, methylcellulose, carboxymethylcellulose (CMC), cellulose acetate, glycerin, ethyl cellulose or the like is used. It is further described in Patent Document 4 that as a drying method, ambient temperature drying, autoclave drying or humidity conditioning drying to prevent cracks is preferable. However, there is the problem that the volatile solvent is used in this plugging material and hence the drying method is limited.

The present invention has been developed in view of the above-mentioned problem, and an object thereof is to provide a manufacturing method of a plugged honeycomb structure in which it is possible to decrease a plugging slurry to be discarded in an operation of charging the plugging slurry into cells.

According to a first aspect of the present invention, a manufacturing method of a plugged honeycomb structure is provided, including a honeycomb structure forming step of forming a pillar-shaped honeycomb structure having partition walls defining a plurality of cells which become through channels for fluid and extend from a first end face to a second end face, and a plugging step of forming plugging portions in end portions of the cells of the honeycomb structure formed in the honeycomb structure forming step, wherein in the plugging step, there is performed a press pouring operation of pressing one end face of the honeycomb structure into a plugging slurry stored in a bottomed tubular container to pour, under pressure, the plugging slurry into the cells of the honeycomb structure, and as the plugging slurry of the plugging step, there is used a slurry in which a yield point viscosity of a viscous fluidity is 600 Pa·s or more, a recovery viscosity is 300 Pa·s or more, and a high shearing viscosity is 200 Pa·s or less.

According to a second aspect of the present invention, the manufacturing method of the plugged honeycomb structure according to the above first aspect is provided, wherein the plugging slurry contains a thickener.

According to a third aspect of the present invention, the manufacturing method of the plugged honeycomb structure according to the above second aspect is provided, wherein the thickener is at least one selected from the group consisting of synthetic smectite, silica fume, a crystalline nanocellulose fiber, a water-soluble polymer, water-soluble polymer saccharide, and inorganic particles.

According to a fourth aspect of the present invention, the manufacturing method of the plugged honeycomb structure according to the above second or third aspects is provided, wherein the plugging slurry contains water-soluble polymer saccharide or synthetic smectite as the thickener, and further contains a lubricant.

According to a fifth aspect of the present invention, the manufacturing method of the plugged honeycomb structure according to the above fourth aspect is provided, wherein synthetic smectite includes synthetic saponite.

According to a manufacturing method of a plugged honeycomb structure of the present invention, in a case of immersing a honeycomb structure into a plugging slurry to charge the plugging slurry into cells, it is possible to decrease the plugging slurry which is not charged into the cells but is discarded. Furthermore, according to the manufacturing method of the plugged honeycomb structure of the present invention, it is possible to prevent the plugging slurry once charged into the cells from flowing backwards.

DESCRIPTION OF THE PREFERRED EMBODIMENTS

Figure 1:
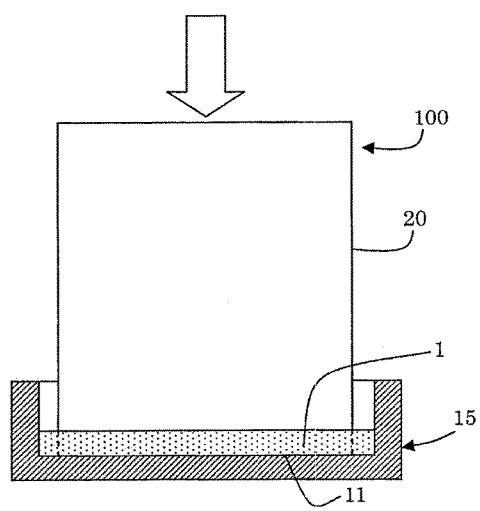
FIG. 1 is an explanatory view schematically showing a plugging step in one embodiment of a manufacturing method of a plugged honeycomb structure of the present invention.

Hereinafter, an embodiment of the present invention will specifically be described with reference to the drawings. The present invention is not limited to the following embodiment. It should be understood that the following embodiment to which modifications, improvements and others are added on the basis of ordinary knowledge of a person skilled in the art without departing from the gist of the present invention falls in the scope of the present invention.

(1) Manufacturing Method of Plugged Honeycomb Structure:

One embodiment of a manufacturing method of a plugged honeycomb structure of the present invention includes a honeycomb structure forming step and a plugging step. The honeycomb structure forming step is a step of forming a pillar-shaped honeycomb structure having partition walls defining a plurality of cells which become through channels for fluid and extend from a first end face to a second end face. The plugging step is a step of forming plugging portions in end portions of the cells of the honeycomb structure formed in the honeycomb structure forming step. Furthermore, in the plugging step, there is performed a press pouring operation of pressing one end face of the honeycomb structure into a plugging slurry stored in a bottomed tubular container to pour, under pressure, the plugging slurry into the cells of the honeycomb structure. Furthermore, in the present invention, as the plugging slurry of the plugging step, there is used a slurry in which a yield point viscosity of a viscous fluidity is 600 Pa·s or more, a recovery viscosity is 300 Pa·s or more, and a high shearing viscosity is 200 Pa·s or less.

According to the manufacturing method of the plugged honeycomb structure of the present invention, in a case of immersing the honeycomb structure into the plugging slurry to charge the plugging slurry into the cells, it is possible to decrease the plugging slurry which is not charged into the cells but is discarded. Furthermore, according to the manufacturing method of the plugged honeycomb structure of the present invention, in the case of immersing the honeycomb structure into the plugging slurry to charge the plugging slurry into the cells, it is possible to prevent that a large amount of plugging slurry overflows to move (escape) to the side of a side surface of the honeycomb structure. That is, according to the manufacturing method of the plugged honeycomb structure of the present invention, it is possible to decrease the plugging slurry which is not charged into the cells but is wasted (discarded). Here, the conventional plugging slurry escapes to the side surface side of the honeycomb structure for the following reason. That is, when a small shearing force is only applied to the conventional plugging slurry, a fluidity is generated, and the plugging slurry flows out to the side surface side of the honeycomb structure before reaching a shear velocity at which the slurry can be poured under pressure into predetermined cells positioned in a circumferential portion. In the manufacturing method of the plugged honeycomb structure of the present invention, the yield point viscosity of the viscous fluidity of the plugging slurry is increased up to a constant viscosity or more, thereby generating the fluidity when the slurry reaches the shear velocity at which the slurry can be poured under pressure into the cells positioned in the circumferential portion. As a result, it is possible to prevent the plugging slurry from moving to the side surface side of the honeycomb structure, and hence it is possible to also suitably charge the plugging slurry into the cells positioned in the circumferential portion of the honeycomb structure.

Furthermore, there is the problem that the plugging slurry once poured under pressure into the cells of the honeycomb structure flows backwards to flow outside. Such a problem is caused because the fluidity of the plugging slurry does not deteriorate after completion of the pouring under pressure. To eliminate this problem, in the present invention, the recovery viscosity of the plugging slurry in a state where the shear velocity is low is increased after the completion of the pouring under pressure, so that it is possible to prevent the backflow of the plugging slurry.

(1-1) Honeycomb Structure Forming Step:

In the present step, a forming raw material is first kneaded to form a kneaded material. It is preferable to prepare the forming raw material by adding a binder, a surfactant, a pore former, water and others to a ceramic raw material. It is preferable that the ceramic raw material is at least one selected from the group consisting of silicon carbide, a silicon-silicon carbide based composite material, a cordierite forming raw material, cordierite, mullite, alumina, titania, spinel, a silicon carbide-cordierite based composite material, lithium aluminum silicate, aluminum titanate, and an iron-chromium-aluminum based alloy. Among these ceramic raw materials, the cordierite forming raw material, the silicon-silicon carbide based composite material or aluminum titanate is preferable, and the silicon-silicon carbide based composite material is especially preferable.

Examples of the binder include methylcellulose, hydroxypropoxyl cellulose, hydroxyethyl cellulose, carboxymethylcellulose, and polyvinyl alcohol. Among these binders, it is preferable to use methylcellulose together with hydroxypropoxyl cellulose. It is preferable that a content of the binder is from 4 to 12 mass % to the whole forming raw material.

It is preferable that a content of water is from 15 to 30 mass % to the whole forming raw material.

As the surfactant, ethylene glycol, dextrin, fatty acid soap, polyalcohol or the like is usable. Among these surfactants, one type of surfactant may be used alone, or any combination of two or more types of surfactants may be used. It is preferable that a content of the surfactant is from 0.1 to 0.5 mass % to the whole forming raw material.

There is not any special restriction on the pore former as long as pores can be formed after firing. Examples of the pore former include starch, foamable resin, water absorbable resin, silica gel, and carbon. It is preferable that a content of the pore former is from 5 to 30 mass % to the whole forming raw material.

There is not any special restriction on a method of kneading the forming raw material to form the kneaded material, and an example of the method is a method of using a kneader, a vacuum pugmill or the like.

Next, the kneaded material is extruded to form a pillar-shaped honeycomb formed body. The honeycomb formed body has partition walls defining a plurality of cells which become through channels for fluid and extend from a first end face of one end face to a second end face of the other end face.

It is to be noted that a shape of a cross section of the honeycomb formed body which is perpendicular to a cell extending direction can suitably be determined in accordance with a use application. Examples of the shape include a round shape, an elliptic shape, a racetrack shape, a quadrangular shape, a pentangular shape, a hexagonal shape, another polygonal shape, and another shape.

There is not any special restriction on a method of forming the kneaded material to form the honeycomb formed body, and a heretofore known forming method such as the extrusion is usable. That is, a suitable example of a method of forming the kneaded material to form the honeycomb formed body is a method of performing the extrusion by use of a die having a desirable cell shape, partition wall thickness and cell density to form the honeycomb formed body. As a material of the die, cemented carbide which is hard to be worn is preferable.

Next, by drying the obtained honeycomb formed body, a honeycomb dried body (the honeycomb structure) is obtainable. There is not any special restriction on a drying method, and examples of the drying method include an electromagnetic heating method such as microwave heating drying or high-frequency induction heating drying, and an external heating method such as hot air drying or superheated steam drying.

It is to be noted that "the honeycomb structure" in the present specification means a structure which is in the form of a honeycomb. That is, each of the honeycomb formed body obtained by forming the kneaded material, the honeycomb dried body obtained by drying this honeycomb formed body and a honeycomb fired body obtained by firing the honeycomb dried body corresponds to the honeycomb structure. The honeycomb form is a shape having partition walls defining a plurality of cells which become through channels for fluid and extend from a first end face of one end face to a second end face of the other end face.

(1-2) Plugging Step:

In the present step, the plugging portions are formed in the end portions of the cells of the honeycomb structure obtained in the honeycomb structure forming step. Specifically, it is preferable to form the plugging portions in open ends of predetermined cells in the one end face of the honeycomb structure and to form the plugging portions in open ends of the residual cells in the other end face. In the honeycomb structure in which the plugging portions are formed, it is preferable that the predetermined cells in which the plugging portions are formed on the side of the one end face and the residual cells in which the plugging portions are formed on the side of the other end face are alternately arranged to form a checkerboard pattern in both the end faces.

It is preferable that a method of plugging the honeycomb structure first includes attaching a sheet to the one end face of the honeycomb structure and then making holes at positions of the sheet which correspond to the cells in which the plugging portions are to be formed. More specifically, it is possible to suitably use a method of attaching an adhesive film to the whole one end face of the honeycomb structure and then making the holes by laser only in portions of the adhesive film which correspond to the cells (the predetermined cells) in which the plugging portions are to be formed. As the adhesive film, there is preferably usable a film which is made of polyester, polyethylene, polypropylene or a resin such as a thermosetting resin and whose one surface is coated with an adhesive agent.

Next, there is performed an operation (a press pouring operation) of pouring, under pressure, the plugging slurry into the cells of the honeycomb structure to which the adhesive film is attached. Specifically, the press pouring operation of the plugging slurry is an operation of, as shown in FIG. 1, storing a plugging slurry 1 in a bottomed tubular container 15, and pressing one end face 11 of a honeycomb formed body into the plugging slurry 1 to pour, under pressure, the plugging slurry 1 into the cells.

Figure 3:
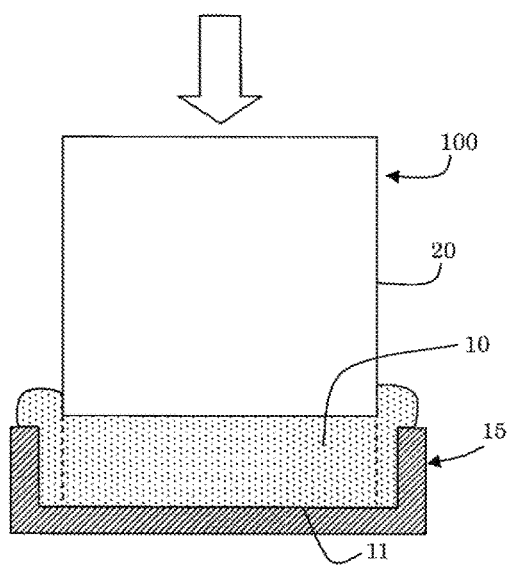
FIG. 3 is an explanatory view schematically showing a plugging step in a conventional manufacturing method of a plugged honeycomb structure.

Here, FIG. 3 shows a plugging step in a conventional manufacturing method of a plugged honeycomb structure. Heretofore, on pressing one end face 11 of a honeycomb structure 100 into a plugging slurry 10 stored in a bottomed tubular container 15 as shown in FIG. 3, a large amount of plugging slurry 10 has overflowed to move to the side of a side surface 20 of the honeycomb structure 100. The plugging slurry 10 which is not charged into cells but overflows in this manner is discarded and is therefore wasted.

In the present invention, the plugging slurry satisfying predetermined conditions is used, and hence it is hard to cause the problem that the plugging slurry moves (escapes) to the side of the side surface of the honeycomb structure. Therefore, in the present invention, it is possible to decrease an amount of the plugging slurry which is not charged into the cells of the honeycomb structure but is discarded.

Figure 2:
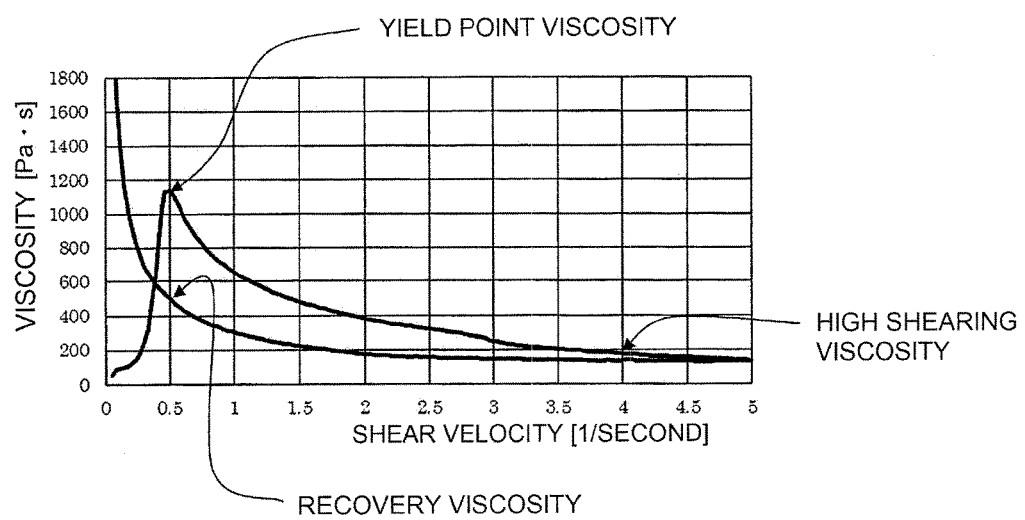
FIG. 2 is a graph showing a relation between a shear velocity and a viscosity of a plugging slurry in the one embodiment of the manufacturing method of the plugged honeycomb structure of the present invention.

In the present step, as the plugging slurry, there is used the slurry in which the yield point viscosity of the viscous fluidity is 600 Pa·s or more, the recovery viscosity is 300 Pa·s or more, and the high shearing viscosity is 200 Pa·s or less. FIG. 2 is a graph showing a relation between the shear velocity and the viscosity of the plugging slurry in the one embodiment of the manufacturing method of the plugged honeycomb structure of the present invention.

Here, the yield point viscosity of the viscous fluidity, the recovery viscosity and the high shearing viscosity are measurable and obtainable as follows. That is, it is possible to measure and obtain the viscosity when controlling a temperature of the plugging slurry in a range of 20 to 30° C., increasing the shear velocity from 0 (1/second) to 5.0 (1/second), and then decreasing the shear velocity to 0 (1/second) again. As a viscosity measuring device, "HAAKE Viscotester 550" manufactured by Thermo Fisher Scientific K. K. is usable.

"The yield point viscosity of the viscous fluidity" is the viscosity just before the plugging slurry develops the fluidity in a case of increasing the shear velocity from 0 (1/second) to 5.0 (1/second) as described above (see FIG. 2). That is, the viscosity indicates the viscosity of the plugging slurry which is maximized (i.e., a maximum value of the viscosity) in the case of increasing the shear velocity from 0 (1/second) to 5.0 (1/second) in the plugging slurry.

"The recovery viscosity" is a viscosity on the side of the decrease of the shear velocity (when the shear velocity is increased to 5.0 (1/second) and then decreased to 0 (1/second) again) in the shear velocity when the above yield point viscosity is determined during the above measurement of the viscosity (see FIG. 2). That is, when measuring the viscosity of the plugging slurry as described above, the shear velocity in the yield point viscosity is defined as "a corresponding shear velocity X". At this time, the viscosity in the same shear velocity as the above "corresponding shear velocity X" in the middle of the decrease of the shear velocity from 5.0 (1/second) to 0 (1/second) after increasing the shear velocity to 5.0 (1/second) is referred to as the recovery viscosity.

"The high shearing viscosity" is a viscosity when the shear velocity is 4.0 (1/second) during the increase of the shear velocity in the above viscosity measurement (see FIG. 2).

The yield point viscosity of the viscous fluidity is preferably from 500 to 3000 Pa·s, further preferably from 600 to 2000 Pa·s, and especially preferably from 600 to 1800 Pa·s.

By setting the yield point viscosity of the viscous fluidity to the above range, it is possible to generate the fluidity of the slurry when the shear velocity sufficiently reaches a velocity to enable the pouring under pressure into the cells positioned in the circumferential portion. When the above yield point viscosity is smaller than a lower limit value, the plugging slurry escapes to a clearance between the honeycomb structure and the container, and the wasted plugging slurry increases. When the above yield point viscosity is in excess of an upper limit value, it is difficult to apply and spread the slurry into the press pouring container prior to the press pouring operation, and hence depths of the plugging portions remarkably become nonuniform.

It is preferable that the recovery viscosity is 300 Pa·s or more. When the recovery viscosity is adjusted into the above range, the plugging slurry poured under pressure into the cells is easily stored in the cells, and backflow from the cells can be prevented. When the above recovery viscosity is smaller than a lower limit value, the plugging slurry poured under pressure into the cells is not easily stored in the cells, and easily flows backward from the cells.

The high shearing viscosity is preferably 250 Pa·s or less and further preferably 200 Pa·s or less. The high shearing viscosity is in the above range, whereby a fluidity resistance in pouring, under pressure, the slurry into the cells (i.e., a consistency to the flow) decreases, and hence the slurry is easily charged into the cells. When the above high shearing viscosity is in excess of an upper limit value, the fluidity in charging the slurry into the cells increases, and hence the slurry easily escapes to a clearance in which the fluidity resistance is lower.

The plugging slurry can include the same raw material as the forming raw material of the honeycomb formed body and preferably contains a thickener. Thus, the thickener is added, so that it is possible to suitably prepare the plugging slurry satisfying predetermined conditions of the yield point viscosity of the viscous fluidity, the recovery viscosity and the high shearing viscosity.

It is preferable that the thickener is at least one selected from the group consisting of synthetic smectite, silica fume, a crystalline nanocellulose fiber, a water-soluble polymer, water-soluble polymer saccharide, and inorganic particles. When using this thickener, thixotropic properties of the slurry improve, and it is possible to increase a ratio between the yield point viscosity and the high shearing viscosity.

Smectite is a generic name of a plate-shaped mineral having a basic crystal structure constituted of three layers, i.e., a tetrahedral layer, an octahedral layer and a tetrahedral layer which include a layer (the tetrahedral layer) having a tetrahedral structure and constituted of tetravalent silicon ions and a layer (the octahedral layer) having an octahedral structure and constituted of divalent and trivalent cations. Furthermore, synthetic smectite is smectite artificially synthesized by a hydrothermal method or the like.

Examples of a commercially available product of synthetic smectite include "synthetic inorganic polymer Sumecton SA" which is synthetic saponite manufactured by Kunimine Industries Co., Ltd., "Lucentite SWN" which is synthetic lucentite manufactured by Co-op Chemical Co., Ltd., and "Laponite RDS" which is synthetic laponite manufactured by BYK Japan K. K.

There is not any special restriction on water-soluble polymer saccharide as long as the water-soluble polymer saccharide functions as the thickener. Examples of the water-soluble polymer saccharide include xanthan gum, diutan gum, and welan gum.

There is not any special restriction on the water-soluble polymer as long as the water-soluble polymer functions as the thickener. Examples of the water-soluble polymer include a cellulose based water-soluble polymer, a polycarboxylic acid based water-soluble polymer, and a polyethylene glycol based polymer.

There is not any special restriction on the inorganic particles as long as the inorganic particles function as the thickener. Examples of the inorganic particles include particulate silica and the like.

The plugging slurry may include a lubricant such as trehalose or sucrose, glycerin, a surfactant and others in addition to the thickener.

It is preferable that the plugging slurry contains the water-soluble polymer saccharide or synthetic smectite as the thickener, and further contains the lubricant. When the slurry contains these additives, the thixotropic properties of the slurry increase, and the ratio between the yield point viscosity and the high shearing viscosity can be increased, It is preferable that the plugging slurry includes synthetic saponite as synthetic smectite. By setting these conditions, it is possible to further increase the ratio between the yield point viscosity and the high shearing viscosity (i.e., a value calculated by the yield point viscosity/the high shearing viscosity) as compared with another thickener.

There is not any special restriction on a ratio of the thickener to be added. For example, the ratio of the thickener to be added is preferably from 0.1 to 12 mass % and further preferably from 0.5 to 1.5 mass % in the plugging slurry (a solid content). Thus, the ratio of the thickener to be added is adjusted into the above range, whereby the yield point viscosity of the viscous fluidity, the recovery viscosity and the high shearing viscosity can suitably be adjusted into the above range.

There is not any special restriction on a ratio of the lubricant to be added. For example, the ratio of the lubricant to be added is preferably from 0 to 10 mass %, further preferably from 1 to 6 mass % and especially preferably from 1 to 4 mass % in the plugging slurry (the solid content). Thus, the ratio of the lubricant to be added is adjusted into the above range, whereby the yield point viscosity of the viscous fluidity, the recovery viscosity and the high shearing viscosity can suitably be adjusted into the above range.

It is preferable that the plugging slurry does not include a volatile solvent. The plugging slurry is an aqueous plugging slurry, and according to this aqueous plugging slurry, the drying method is not selected, and hence a constitution of a device becomes simple.

It is preferable that a pressure in pressing the honeycomb structure into the plugging slurry is from 0.05 to 0.4 MPa. When the above pressure is smaller than a lower limit value, the plugging slurry is hard to be charged into the cells of the honeycomb structure. When the pressure is in excess of an upper limit value, the honeycomb structure might be chipped.

The above press pouring operation of the plugging slurry is performed to charge the plugging slurry into one end portion of each cell of the honeycomb structure (one end face of the honeycomb structure). Afterward, the press pouring operation of the plugging slurry is similarly preferably performed into the other end portions of the cells of the honeycomb structure (the other end face of the honeycomb structure) to charge the plugging slurry into the cells. It is to be noted that both the end faces of the honeycomb structure may simultaneously be subjected to the press pouring operation to simultaneously charge the plugging slurry into both the end faces.

In a case of charging the plugging slurry into the other end face of the honeycomb structure, it is preferable to first attach the sheet to the other end face of the honeycomb structure, and then make holes at positions of the sheet which correspond to the cells into which the plugging slurry is not charged in the one end face. It is preferable that a type of sheet and a method of making the holes are similar to those in the above case of charging the plugging slurry into the one end face of the honeycomb structure. Afterward, the press pouring operation of the plugging slurry is performed to charge the plugging slurry into the other end face of the honeycomb structure. It is preferable that the press pouring operation of the plugging slurry is similar to that in the above case of charging the plugging slurry into the one end face of the honeycomb structure.

(1-3) Firing Step:

Next, the honeycomb structure into which the plugging slurry is charged is fired, so that the plugged honeycomb structure can be prepared in which the plugging portions are formed at the predetermined positions of both the end faces (e.g., to form the checkerboard pattern).

Furthermore, it is preferable to perform degreasing (calcinating) to remove the binder and the like prior to the firing. As preferable conditions, the calcinating is performed at 300 to 500° C. in the air atmosphere for 2 to 6 hours. There is not any special restriction on a calcinating or firing method, and the firing can be performed by using an electric furnace, a gas furnace or the like.

As preferable firing conditions, the firing is performed at 1400 to 1450° C. in the air atmosphere or in an inert atmosphere of nitrogen, argon or the like as required, for 1 to 4 hours.

EXAMPLES

Hereinafter, the present invention will further specifically be described with reference to examples. The present invention is not limited to these examples.

Example 1

(Preparation of Honeycomb Formed Body)

As a ceramic raw material, a mixture of silicon carbide (SiC) powder and metal silicon (Si) powder was used. Then, to this ceramic raw material, hydroxypropyl methylcellulose was added as a binder, a pore former was added, and water was also added to prepare a forming raw material. Then, the forming raw material was kneaded with a vacuum pugmill, to prepare a kneaded material.

A content of the binder was 7 parts by mass when a total of the silicon carbide (SiC) powder and the metal silicon (Si) powder was 100 parts by mass. A content of the pore former was 3 parts by mass when the total of the silicon carbide (SiC) powder and the metal silicon (Si) powder was 100 parts by mass. A content of water was 42 parts by mass when the total of the silicon carbide (SiC) powder and the metal silicon (Si) powder was 100 parts by mass. An average particle diameter of the silicon carbide powder was 20 µm and an average particle diameter of the metal silicon powder was 6 µm. Furthermore, an average particle diameter of the pore former was 20 µm. The average particle diameters of the silicon carbide powder, the metal silicon powder and the pore former were values measured by laser diffractometry.

Next, the obtained kneaded material was formed by using an extrusion machine and a quadrangular pillar-shaped honeycomb formed body was obtained. Then, the obtained honeycomb formed body was heated and dried by high-frequency induction, and was then dried at 120° C. for two hours by use of a hot air dryer, to obtain a honeycomb structure.

The obtained honeycomb structure had a quadrangular pillar shape in which a cross section perpendicular to a cell extending direction had a diameter of 38 mm. Furthermore, in the honeycomb structure, a length in the cell extending direction was 154 mm. Furthermore, in the honeycomb structure, a cell density was 46 cells/cm² and a partition wall thickness was 330 μm.

(Preparation of Plugging Slurry)

As a plugging slurry, there was used a slurry made of a ceramic raw material, a thickener and a lubricant, and additionally 28 mass % of ion-exchanged water to a solid content and 8 mass % of glycerin to the solid content. As the ceramic raw material, 95.3 mass % of the mixture of the silicon carbide (SiC) powder and the metal silicon (Si) powder was used. There was used the thickener containing 0.3 mass % of xanthan gum (water-soluble polymer saccharide), 0.2 mass % of polyethylene oxide and 0.3 mass % of methylcellulose. Furthermore, as the lubricant, 4.0 mass % of trehalose was used. In this plugging slurry, a yield point viscosity of a viscous fluidity was 1580 Pa·s, a recovery viscosity was 848 Pa·s, and a high shearing viscosity was 184 Pa·s. It is to be noted that in Table 1, "%" indicates mass %.

(Formation of Plugging Portion)

Next, there was performed a press pouring operation of charging the plugging slurry into cells of the obtained honeycomb structure. Specifically, an adhesive film was attached to each of both end faces of the honeycomb structure and holes were made with laser at positions of the adhesive film which corresponded to the cells in which plugging portions were to be formed. Additionally, a material of the adhesive film was polypropylene (PP). Afterward, each of both end portions of the honeycomb structure was pressed into the plugging slurry stored in a bottomed tubular container to pour, under pressure, the plugging slurry into predetermined cells. Furthermore, a pressure in pressing the honeycomb structure into the plugging slurry was set to 0.3 MPa. Afterward, the honeycomb structure was pulled out from the container. In this manner, mutually opposite end portions of adjacent cells were plugged, and the plugging portions were formed in end portions of the respective cells so that both the end faces possessed a checkerboard pattern.

Furthermore, as the container for use in the press pouring operation of the plugging slurry, there was used a bottomed prismatic columnar container having a quadrangular shape in which one side of a bottomed surface (which corresponded to an inner diameter of a quadrangular pillar) had a size of 39 mm, and having a height of 15 mm. Furthermore, a depth of the plugging slurry when the plugging slurry was stored in this container was set to 4 mm.

Afterward, the honeycomb structure into which the plugging slurry was charged was dried at 120° C. for 30 minutes. Afterward, the plugging slurry was also similarly poured under pressure into the other end face of the above honeycomb structure, followed by drying. Afterward, the honeycomb structure was fired at 1450° C. in an argon atmosphere for 2 hours to obtain a plugged honeycomb structure.

The obtained plugged honeycomb structure had a prismatic columnar shape in which one side of a quadrangular bottom surface had a size of 36.5 mm and a length in the cell extending direction was 153 mm.

(Yield of Plugging Slurry)

The plugging slurry was poured under pressure into the cells of the honeycomb structure, and then a ratio (a yield) of an amount of the plugging slurry was calculated from a ratio between an amount of the plugging slurry charged into the cells and an amount of the plugging slurry prior to the press pouring operation. Specifically, the ratio was calculated by Equation: the slurry yield=the amount of the charged slurry/the amount of the slurry prior to the press pouring operation. In the present example, the yield of the plugging slurry was 79%. Table 1 shows the results. Furthermore, it is meant that the higher the ratio (the yield) of the amount of the plugging slurry is, the smaller an amount of the plugging slurry to be wasted (to be discarded) becomes.

Table 2 shows, in a column of "loss improvement effect", a calculated value of an improvement effect of the yield in a case where the yield of Comparative Example 1 is defined as a standard. Specifically, the value is calculated by Equation: the loss improvement effect=(the yield of the plugging slurry of the example or the comparative example—the yield (63%) of the plugging slurry of Comparative Example 1)/the yield (63%) of the plugging slurry of Comparative Example 1. For example, "the loss improvement effect" in Example 1 was calculated by [|179 (the value of the yield of the plugging slurry in Example 1)—63 (the value of the yield of the plugging slurry in Comparative Example 1)|/63 (the value of the yield of the plugging slurry in Comparative Example 1)]×100.

TABLE 1

| | Liquid content | | Ceramic raw material | Thickener | | | | | Lubricant |
|---|---|---|---|---|---|---|---|---|---|
| | *External blend to 100 of ceramic raw material | | Silicon-silicon carbide based | Water-soluble polymer saccharide | | Water-soluble polymer | | Synthetic smectite | |
| | Mixing water | Glycerin | composite material | Xanthan gum | Diutan gum | Polyethylene oxide | Methyl-cellulose | Sumecton SA | Trehalose |
| Comparative Example 1 | 28% | 8.0% | 99.6% | 0.0% | 0.0% | 0.2% | 0.3% | 0.0% | 0.0% |
| Comparative Example 2 | 28% | 8.0% | 97.6% | 0.0% | 0.0% | 0.2% | 0.3% | 0.0% | 2.0% |
| Comparative Example 3 | 28% | 8.0% | 95.6% | 0.0% | 0.0% | 0.2% | 0.3% | 0.0% | 4.0% |
| Comparative Example 4 | 29% | 8.0% | 95.7% | 0.0% | 0.0% | 0.2% | 0.3% | 0.9% | 3.0% |
| Example 1 | 28% | 8.0% | 95.3% | 0.3% | 0.0% | 0.2% | 0.3% | 0.0% | 4.0% |
| Example 2 | 28% | 8.0% | 97.0% | 0.0% | 0.0% | 0.2% | 0.3% | 0.6% | 2.0% |
| Example 3 | 28% | 8.0% | 95.0% | 0.0% | 0.0% | 0.2% | 0.3% | 0.6% | 4.0% |

TABLE 1-continued

| | Liquid content | | Ceramic raw material | Thickener | | | | | |
|---|---|---|---|---|---|---|---|---|---|
| | *External blend to 100 of ceramic raw material | | Silicon-silicon carbide based | Water-soluble polymer saccharide | | Water-soluble polymer | | Synthetic smectite | |
| | Mixing water | Glycerin | composite material | Xanthan gum | Diutan gum | Polyethylene oxide | Methyl-cellulose | Sumecton SA | Lubricant Trehalose |
| Example 4 | 28% | 8.0% | 97.3% | 0.0% | 0.0% | 0.2% | 0.3% | 0.3% | 2.0% |
| Example 5 | 28% | 8.0% | 99.4% | 0.1% | 0.0% | 0.2% | 0.3% | 0.0% | 0.0% |
| Example 6 | 29% | 8.0% | 97.2% | 0.1% | 0.2% | 0.2% | 0.3% | 0.0% | 2.0% |
| Example 7 | 28% | 8.0% | 96.3% | 0.1% | 0.1% | 0.2% | 0.3% | 0.0% | 3.0% |
| Example 8 | 30% | 8.0% | 98.3% | 0.0% | 0.0% | 0.2% | 0.3% | 0.3% | 1.0% |

TABLE 2

| | Result | | | | | |
|---|---|---|---|---|---|---|
| | Yield point viscosity (Pa·s) | Recovery viscosity (Pa·s) | High shearing viscosity (Pa·s@$\gamma$ = 4/s) | Loss improvement effect (%) | Yield (%) | Backflow of plugging slurry |
| Comparative Example 1 | 554 | 380 | 186 | 0% | 63% | None |
| Comparative Example 2 | 546 | 344 | 192 | −3% | 61% | None |
| Comparative Example 3 | 328 | 264 | 136 | 0% | 63% | Present |
| Comparative Example 4 | 3294.0 | 287.0 | 57.8 | −2% | 62% | Present |
| Example 1 | 1580 | 848 | 184 | 25% | 79% | None |
| Example 2 | 1942 | 318 | 56 | 21% | 76% | None |
| Example 3 | 1744 | 303 | 56 | 22% | 77% | None |
| Example 4 | 679 | 369 | 145 | 24% | 78% | None |
| Example 5 | 1125 | 548 | 198 | 27% | 80% | None |
| Example 6 | 1490 | 680 | 176 | 22% | 77% | None |
| Example 7 | 1025.0 | 542.0 | 136.0 | 24% | 78% | None |
| Example 8 | 1869.0 | 476.7 | 95.8 | 27% | 80% | None |

(Backflow of Plugging Slurry)

As to the plugging slurry, it was confirmed whether or not a backflow was present when the plugging slurry was poured under pressure into the honeycomb structure. A case where the plugging slurry was not received in the honeycomb structure but overflowed from the honeycomb structure was judged as "present", and a case where the plugging slurry was received in the honeycomb structure and did not overflow was judged as "none".

Examples 2 to 8 and Comparative Examples 1 to 4

The procedure of Example 1 was repeated except that conditions were changed as shown in Table 1, to prepare plugged honeycomb structures. Then, a ratio (a yield) of an amount of a plugging slurry was calculated. Table 2 shows the results.

It can be seen from Table 2 that according to a manufacturing method of a plugged honeycomb structure of each of Examples 1 to 8, as compared with a manufacturing method of a plugged honeycomb structure of each of Comparative Examples 1 to 4, it is possible to decrease a wasted plugging slurry in charging a plugging slurry into cells.

A manufacturing method of a plugged honeycomb structure of the present invention is suitably employable as a manufacturing method of a plugged honeycomb structure which is utilizable as a filter to purify an exhaust gas from a car or the like.

DESCRIPTION OF REFERENCE NUMERALS 1 and 10: plugging slurry, 11: end face, 15: container, 20: side surface, and 100: honeycomb structure.

What is claimed is:

1. A manufacturing method of a plugged honeycomb structure, comprising:
   a honeycomb structure forming step of forming a pillar-shaped honeycomb structure having partition walls defining a plurality of cells which become through channels for fluid and extend from a first end face to a second end face; and
   a plugging step of forming plugging portions in end portions of the cells of the honeycomb structure formed in the honeycomb structure forming step,
   wherein in the plugging step, a pressing operation of pressing one end face of the honeycomb structure into a plugging slurry stored in a bottomed tubular container to press, under pressure, the plugging slurry into the cells of the honeycomb structure,
   wherein the plugging slurry has a yield point viscosity of 600 Pa·s or more, a recovery viscosity of 300 Pa·s or more, and a high shearing viscosity of 200 Pa·s or less, and
   wherein the yield point viscosity and the recovery viscosity are measured at the same shear velocity.

2. The manufacturing method of the plugged honeycomb structure according to claim 1,
   wherein the plugging slurry contains a thickener.

3. The manufacturing method of the plugged honeycomb structure according to claim 2,
   wherein the thickener is at least one selected from the group consisting of synthetic smectite, silica fume, a crystalline nanocellulose fiber, a water-soluble polymer, water-soluble polymer saccharide, and inorganic particles.

4. The manufacturing method of the plugged honeycomb structure according to claim 2,
   wherein the plugging slurry contains water-soluble polymer saccharide or synthetic smectite as the thickener, and further contains a lubricant.

5. The manufacturing method of the plugged honeycomb structure according to claim 4,
   wherein synthetic smectite includes synthetic saponite.

* * * * *